United States Patent
Fein et al.

(10) Patent No.: US 7,668,926 B2
(45) Date of Patent: *Feb. 23, 2010

(54) REAL-TIME COMMUNICATIONS OVER DATA FORWARDING FRAMEWORK

(76) Inventors: Gene Fein, 29712 Zuma Bay Way, Malibu, CA (US) 90265; Edward Merritt, 139 Lime Kiln Rd., Lenox, MA (US) 01240

( * ) Notice: Subject to any disclaimer, the term of this patent is extended or adjusted under 35 U.S.C. 154(b) by 0 days.

This patent is subject to a terminal disclaimer.

(21) Appl. No.: 12/329,253

(22) Filed: Dec. 5, 2008

(65) Prior Publication Data

US 2009/0271492 A1 Oct. 29, 2009

Related U.S. Application Data

(63) Continuation of application No. 12/109,458, filed on Apr. 25, 2008, now abandoned.

(51) Int. Cl.
G06F 15/167 (2006.01)

(52) U.S. Cl. ....................................................... 709/212

(58) Field of Classification Search ................. 709/251, 709/212; 710/100
See application file for complete search history.

(56) References Cited

U.S. PATENT DOCUMENTS

| | | | | |
|---|---|---|---|---|
| 5,787,258 A | * | 7/1998 | Costa et al. | 709/251 |
| 6,151,395 A | * | 11/2000 | Harkins | 380/286 |
| 6,205,478 B1 | | 3/2001 | Sugano et al. | 709/223 |
| 6,587,866 B1 | | 7/2003 | Modi et al. | 709/105 |
| 6,677,976 B2 | | 1/2004 | Parker et al. | 348/14.08 |
| 6,684,258 B1 | * | 1/2004 | Gavin et al. | 709/251 |
| 6,907,447 B1 | | 6/2005 | Cooperman et al. | 709/203 |
| 7,043,530 B2 | | 5/2006 | Isaacs et al. | 709/206 |
| 7,143,170 B2 | * | 11/2006 | Swildens et al. | 709/226 |
| 7,240,214 B2 | | 7/2007 | Gazzetta et al. | 713/182 |
| 7,266,776 B2 | | 9/2007 | Quillen et al. | 715/758 |
| 7,356,567 B2 | | 4/2008 | Odell et al. | 709/206 |
| 7,404,002 B1 | * | 7/2008 | Pereira | 709/231 |
| 2002/0194371 A1 | * | 12/2002 | Kadoi | 709/239 |
| 2004/0223503 A1 | * | 11/2004 | Lynch et al. | 370/404 |

(Continued)

FOREIGN PATENT DOCUMENTS

EP 1 746 790 A1 1/2007

(Continued)

OTHER PUBLICATIONS

International Search Report based on PCT/US2009/041817 dated Jun. 30, 2009.

*Primary Examiner*—J Bret Dennison
(74) *Attorney, Agent, or Firm*—Chinh H. Pham; Greenberg Traurig, LLP

(57) ABSTRACT

Methods and apparatus, including computer program products, for real-time communications over data forwarding framework. A framework includes a group of interconnected computer system nodes each adapted to receive data and continuously forward the data from computer memory to computer memory without storing on any physical storage device in response to a request from a client system to store data from a requesting system and retrieve data being continuously forwarded from computer memory to computer memory in response to a request to retrieve data from the requesting system, and at least two client systems linked to the group, each of the client systems executing a real-time communications client program.

17 Claims, 3 Drawing Sheets

U.S. PATENT DOCUMENTS

| | | | |
|---|---|---|---|
| 2005/0201409 A1* | 9/2005 | Griswold et al. | 370/445 |
| 2005/0243823 A1* | 11/2005 | Griswold et al. | 370/389 |
| 2006/0031593 A1* | 2/2006 | Sinclair | 709/251 |
| 2007/0195772 A1* | 8/2007 | Shadish | 370/390 |
| 2009/0067322 A1* | 3/2009 | Shand et al. | 370/225 |

FOREIGN PATENT DOCUMENTS

| | | |
|---|---|---|
| EP | 1 372 316 B1 | 5/2007 |
| WO | 2007001631 | 1/2007 |

\* cited by examiner

REAL-TIME COMMUNICATIONS OVER DATA FORWARDING FRAMEWORK

CROSS-REFERENCE TO RELATED APPLICATIONS

This application is a continuation of U.S. application Ser. No. 12/109,458, filed Apr. 25, 2008, titled "Real-Time Communications Over Data Forwarding Framework," herein incorporated by reference in its entirety. The present patent application is related to U.S. Ser. No. 12/046,757, filed on Mar. 12, 2008; U.S. Ser. No. 12/052,345, filed on Mar. 20, 2008; U.S. Ser. No. 12/132,804, filed Jun. 4, 2008; U.S. Ser. No. 12/099,498, filed on Apr. 8, 2008; U.S. Ser. No. 12/116,610, filed May 7, 2008; U.S. Ser. No. 12/170,901, filed Jul. 10, 2008; U.S. Ser. No. 12/170,925, filed on Jul. 10, 2008; U.S. Ser. No. 12/184,866, filed on Aug. 1, 2008; U.S. Ser. No. 12/240,951, filed on Sep. 29, 2008; U.S. Ser. No. 12/241,032, filed on Sep. 29, 2008; U.S. Ser. No. 12/241,003, filed on Sep. 29, 2008; U.S. Ser. No. 12/240,925, filed on Sep. 29, 2008; U.S. Ser. No. 12/240,991, filed Apr. 25, 2008; U.S. Ser. No. 12/240,967, filed on Sep. 29, 2008; U.S. Ser. No. 12/240,885, filed on Sep. 29, 2008; and U.S. Ser. No. 12/240,757, filed on Sep. 29, 2008.

BACKGROUND

The present disclosure relates to data processing by digital computer, and more particularly to real-time communications over data forwarding framework.

Instant Messaging (IM) is a form of real-time communication between two or more people based on typed text. The text is conveyed using computers connected over a network such as the Internet. IM enables instantaneous communication between a number of parties simultaneously, by transmitting information quickly. Some IM systems enable users to use webcams and microphones for real-time conversations. In addition IM has additional features such as the immediate receipt of acknowledgment or reply, group chatting, conference services (including voice and video), conversation logging and file transfer. For example, it is possible to save a conversation for later reference. Instant messages are typically logged in a local message history that closes the gap to the persistent nature of E-mails and facilitates quick exchange of information like universal resource locators (URLs) or document snippets (which can be unwieldy when communicated via telephone).

SUMMARY

The present invention provides methods and apparatus, including computer program products, for real-time communications over data forwarding framework.

In general, in one aspect, the invention features A method including receiving a request from a first user system linked to a network of interconnected computer system nodes to retrieve data being continuously forwarded from node memory to node memory in the network, the first user system executing a real-time communications client program that establishes a real-time communications session with a second user system executing a real-time communications client program, retrieving the data from node memory in response to the request from the first user system to retrieve data, and forwarding the retrieved data to the second user system.

In another aspect, the invention features a framework including a group of interconnected computer system nodes each adapted to receive data and continuously forward the data from computer memory to computer memory without storing on any physical storage device in response to a request from a client system to store data from a requesting system and retrieve data being continuously forwarded from computer memory to computer memory in response to a request to retrieve data from the requesting system, and at least two client systems linked to the group, each of the client systems executing a real-time communications client program.

Other features and advantages of the disclosure are apparent from the following description, and from the claims.

DETAILED DESCRIPTION

Unlike peer to peer networks, which use data forwarding in a transient fashion so that data is eventually stored on a physical medium such as a disk drive, the present invention enables social networking applications such as instant messaging to be supported by a continuously data forwarding framework, i.e., data is stored by continuously forwarding it from one node memory to another node memory in a network of nodes.

Figure 1:
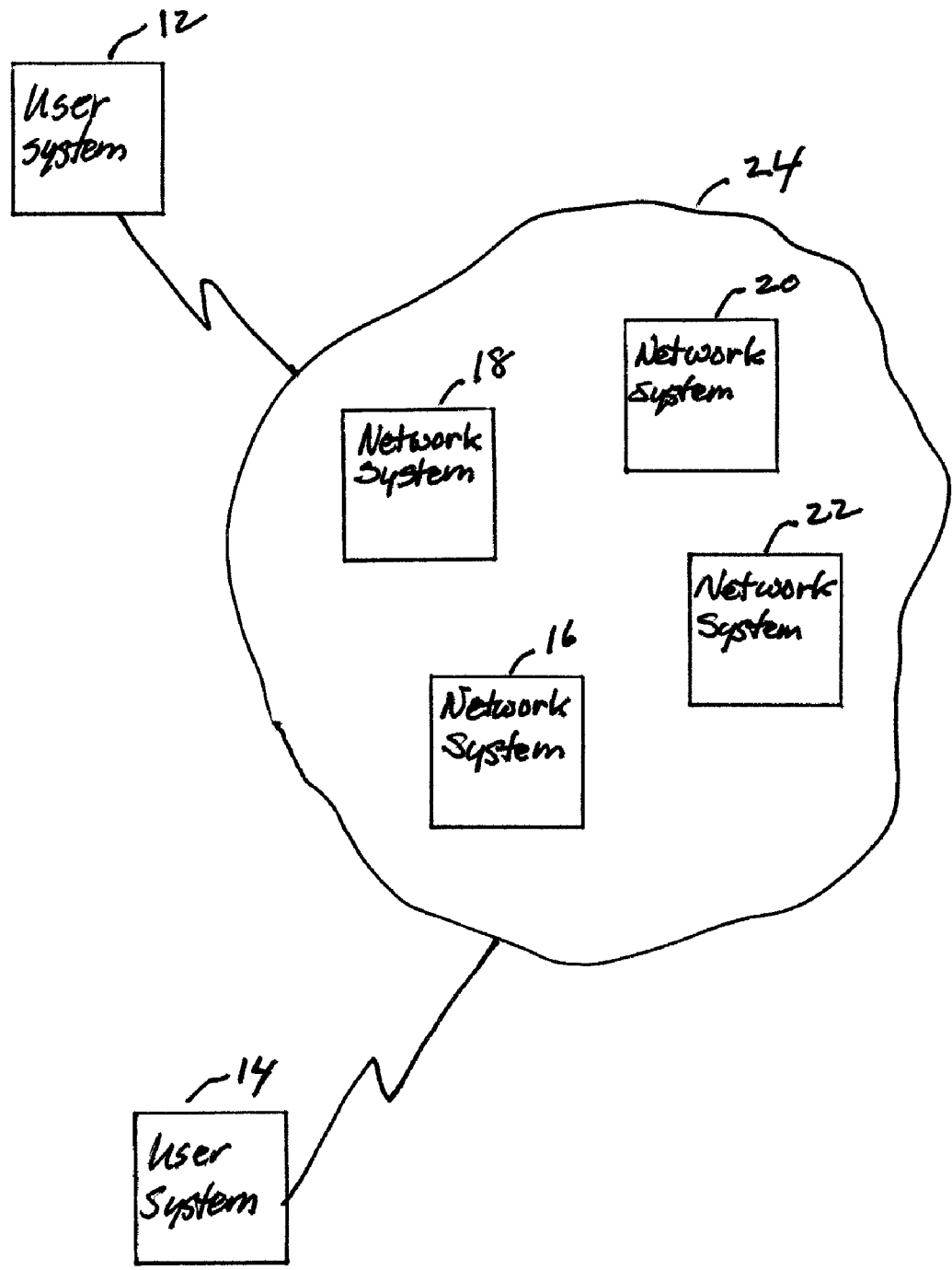
FIG. 1 is a block diagram of an exemplary framework.

As shown in FIG. 1, an exemplary continuously data forwarding framework 10 includes two user systems 12, 14 (also referred to as client systems) coupled to a number of network systems 16, 18, 20, 22 (also referred to as servers). Each of the network systems 16, 18, 20, 22 is considered to be a node in a network 24 and one such network system may be designated as a host or central server, such as network system 16. As such, network system 16 may assume a control position in network 24. Each of the nodes 16, 18, 20, 22 can be established as a privately controlled network of peers under direct control of the central server 16. Peered nodes can also be a mix of private and public nodes (e.g., the Internet), and thus not under the direct physical control of the central server 16. The network 24 can also be wholly public where the central server 16 (or servers) has no direct ownership or direct physical control of any of the peered nodes.

The continuously data forwarding framework 10 supports communications between computer users, such as users on user systems 12, 14. Computer users on user systems 12, 14 are distributed geographically and communicate using one or more of the network systems 16, 18, 20, 22 in network 24. User systems 12, 14 are connected to network 24 through various communication mediums, such as a modem connected to a telephone line (using, for example, serial line internet protocol (SLIP) or point-to-point protocol (PPP)) or a direct internetwork connection (using, for example, transmission control protocol/internet protocol (TCP/IP)).

Each of the user systems 12, 14 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. User systems 12, 14 may receive instructions from, for example, a software application, a program, a piece of code, a device, a computer, a computer system, or a combination thereof, which independently or collectively direct operations, as described herein. These instructions may take the form of one or more communications programs that facilitate communications between the users of client systems 12, 14. For instance, such communications programs may include E-mail programs, Instant Messaging (IM) programs, File Transfer Protocol (FTP) programs, Voice-over-Internet (VoIP) programs, as so forth. The instructions may be embodied permanently or temporarily in any type of machine, component, equipment, or storage medium.

Clients systems 12, 14 include a communications interface (not shown) used by the communications programs to send communications through network 24. The communications may include E-mail, audio data, video data, general binary data, or text data (e.g., encoded in American Standard Code for Information Interchange (ASCII) format).

The network 24 can include a series of portals interconnected through a coherent system. Examples of the network 24 include the Internet, Wide Area Networks (WANs), Local Area Networks (LANs), analog or digital wired and wireless telephone networks (e.g. a Public Switched Telephone Network (PSTN)), an Integrated Services Digital Network (ISDN), a Digital Subscriber Line (xDSL)), or any other wired or wireless network. The network 24 may include multiple networks or sub-networks, each of which may include, for example, a wired or wireless data pathway.

A host server 16 may be connected to network 24 and may be used to facilitate some direct or indirect communications between the client systems 12, 14. As with the client systems 12, 14, host server 16 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. Host server 16 may receive instructions from, for example, a software application, a program, a piece of code, a device, a computer, a computer system, or a combination thereof, which independently or collectively direct operations, as described herein. These instructions may take the form of one or more communications programs. For instance, such communications programs may include E-mail programs, IM programs, FTP programs, VoIP programs, and so forth. The instructions may be embodied permanently or temporarily in any type of machine, component, equipment, or storage medium.

Further, host server 16 includes a communications interface (not shown) used by the communications programs to send communications through network 24. The communications may include E-mail, audio data, video data, general binary data, or text data (e.g., encoded in American Standard Code for Information Interchange (ASCII) format).

The user systems 12, 14 can execute an instant messaging (IM) client program. IM programs typically enable users to communicate in real-time with each other in a variety of ways. Most IM programs provide, for example:

(1) Instant messages—send notes back and forth with a friend who is online (2) Chat—create a chat room with friends or co-workers (3) Web links—share links to your favorite Web sites (4) Video—send and view videos, and chat face to face with friends (5) Images—look at an image stored on your friend's computer (6) Sounds—play sounds for your friends (7) Files—share files by sending them directly to your friends (8) Talk—use the Internet instead of a phone to actually talk with friends (9) Streaming content—real-time or near-real-time stock quotes and news

(10) Mobile capabilities—send instant messages from your cell phone

Examples of IM communications include those provided by AIM (America Online® Instant Messenger), Yahoo® Messenger, MSN® Messenger, and ICQ®, and so forth.

The framework 10 supports these IM communications and enables users to store video, images, sounds, files and other content, which can be included in IM communications. Unlike other systems, such as data storage networks, the framework 10 does not use fixed physical data storage to store data, such as image files and video files, for example. When a request to store data is received by the central server 16 from one of the user systems 12, 14, data is directed to a node in the network 24 where it is then continuously forwarded from node memory to node memory in the network 24 without storing on any physical storage medium such as a disk drive. The forwarded data resides only for a very brief period of time in the memory of any one node in the network 24. Data is not stored on any physical storage medium in any network node.

In a like manner, when a request to retrieve data is received by the central server 16 from a user system 12, 14, the requested data, which is being forwarded from node memory to node memory in the network 24, is retrieved.

Data forwarded in this manner can be segmented and segments forwarded as described above. Sill, the segmented data is not stored on any physical storage medium in any network node, but merely forwarded from the memory of one node to the memory of another node.

Figure 2:
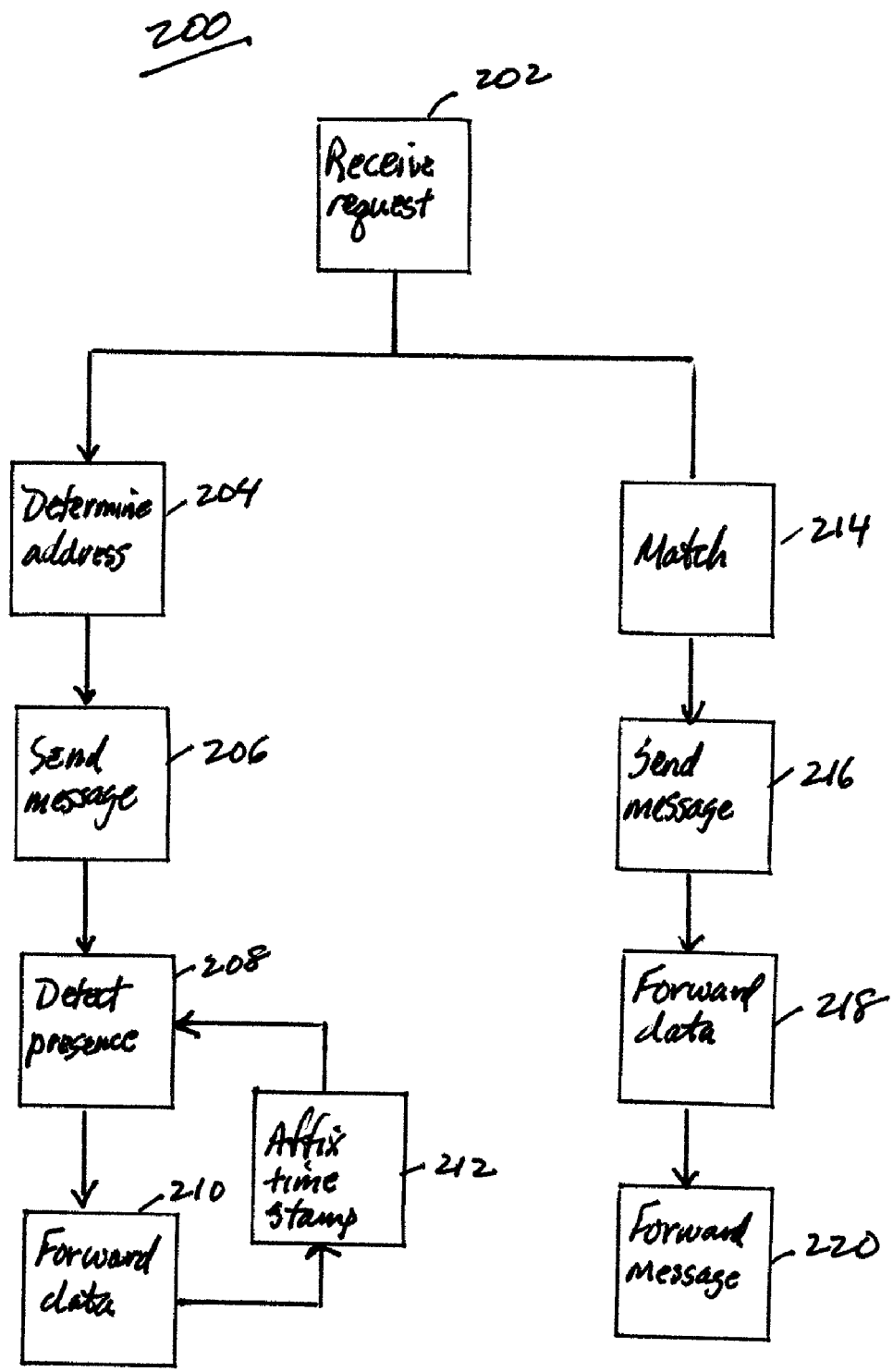
FIG. 2 is a flow diagram.

FIG. 2 illustrates a process 200 that resides on each of the network nodes 16, 18, 20, 22 that facilitates data forwarding. Process 200 includes receiving (202) a request from a user system to store or retrieve data. If the received request is a request to store data, process 200 determines (204) an address of a node available to receive the data in memory. This determination (204) can include pinging the network and determining which of the nodes in a network is available, or determining which node in the network has the least traffic, or determining which node in the network has the largest available memory, or any combination of these or other factors.

Process 200 sends (206) a message to the user system with the address of a specific node for the requester to forward the data.

Process 200 detects (208) the presence of data in node memory. Process 200 forwards (210) the data in memory to another node in the network of nodes and continues to repeat detecting (208) and forwarding (210) of the data from node memory to node memory. When data arrives in any node memory, process 200 affixes (212) a time stamp to the data. Additionally, as data enters and exits any mode memory, the data may be encrypted and de-encrypted.

Forwarding (210) can include pinging the node in the network to determine which of the nodes in the network is available, or determining which node in the network has the least traffic, or determining which node in the network has the largest available memory, or any combination of these or other factors.

In one specific example, at the point of entry to a node, data undergoes an encrypted "handshake" with the node or central server 16 or user. This can be a public or private encryption system, such as the Cashmere system, which can use public-private keys. Cashmere decouples the encrypted forwarding path and message payload, which improves the performance as the source only needs to perform a single public key encryption on each message that uses the destination's unique public key. This has the benefit that only the true destination node will be able to decrypt the message payload and not every node in the corresponding relay group. Cashmere provides the capability that the destination can send anonymous reply messages without knowing the source's identity. This is done in a similar way, where the source creates a reply path and encrypts it in a similar manner as the forwarding path.

In another example, other routing schemes are utilized.

If the received request is a request to retrieve data being continuously forwarded from node memory to node memory, process 200 matches (214) at the central server 16 using a hash mark or other unique code that can be "sniffed" by the node upon the data entering the node via the encryption handshake. This can occur by pinging the nodes in the network. Process 200 sends (216) the message to return the data to the user directly to the node or node state where the central server 16 believes the data will likely appear. The more the central server 16 can narrow the node state that it pings to, then the more efficient the retrieval will become and the less burdened by unnecessary messaging traffic to nodes that are not necessary for a transaction between the central server 16 and the node capable of forwarding the data.

Once the correct node receives the message to forward the data in node memory to the requester, process 200 forwards (218) the data in node memory to the requester and forwards (220) a confirmation message that the data has been sent to the user. This routing message may be sent directly to the central server 16 or may be passed to the central server 16 or servers via other node(s) or supernode(s) in the network 24. Upon the user receiving the requested data the user's application functions to automatically ping the central server 16 that the data requested has been received. Thus the network 24 creates data storage without caching, downloading and/or storing the data on any physical storage medium. Data storage and management is accomplished via a continuously routing of the data from node memory to node memory.

New nodes and node states may be added and/or deleted from the network 24 based upon performance. Users may have access to all nodes or may be segmented to certain nodes or "node states" by the central server(s) or via the specific architecture of the private, public or private-public network.

Individual nodes, nodes states and supernodes may also be extranet peers, wireless network peers, satellite peered nodes, Wi-Fi peered nodes, broadband networks, and so forth, in public or private networks. Peered nodes or users may be used as routing participants in the network 24 from any valid peer point with the same security systems employed, as well as custom solutions suitable for the rigors of specific deployments, such as wireless encryption schemes for wireless peers, and so forth.

In process 200, rather than have data cached or held in remote servers, hard drives or other fixed storage medium, the data are passed, routed, forwarded from node memory to node memory. The data are never downloaded until the authorized user calls for the data. A user on the system may authorize more than one user to have access to the data.

A primary goal in process 200 is to generate a data storage and management system where the data is never fixed in physical storage, but in fact, is continuously being routed/forwarded from node memory to node memory in the network. The path of the nodes to which data is forwarded may also be altered by the central server 16 to adjust for system capacities and to eliminate redundant paths of data that may weaken the security of the network due to the increased probability of data path without this feature.

Figure 3:
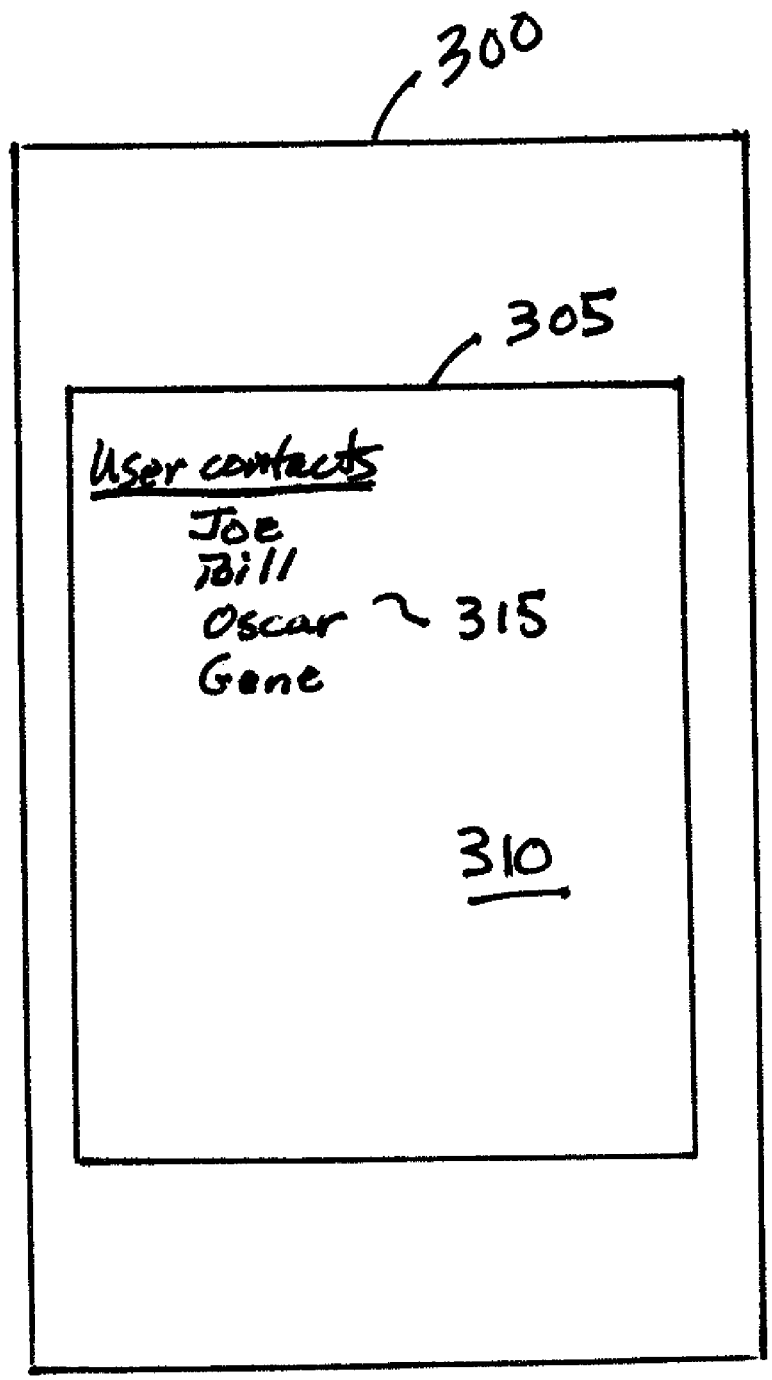
FIG. 3 is an exemplary instant messaging user interface.
Like reference numbers and designations in the various drawings indicate like elements.

FIG. 3 illustrates an example interface presented to a user of one of the client systems 12, 14 when running an instant messaging client program. As described above, instant messaging programs typically enable users to communicate in real-time with each other in a variety of ways. For example, many instant messaging programs enable users to send text as an instant message, to transfer files, and to communicate by voice.

Shown is a desktop 300 with a user interface 305 of the instant messaging client program. User interface 305 has a text box 310 that displays representations 315 of the program user's contacts or buddies (both terms are used interchangeably herein), which are other users of an instant messaging program with whom the program user desires to communicate and interact. The representations 315 may provide contextual information to the program user about the buddy, such as whether the contact is online, how long the contact has been online, whether the contact is away, or whether the contact is using a mobile device.

The list of contacts displayed in text box 310 of user interface 305 typically is referred to as the contact list or buddy list. The IM program user can typically add or remove contacts from the contact list. In the example shown, the representations 315 are text icons showing the screen names of the contacts.

Instant messaging programs may use an instant messaging server to assist in communications between users of the instant messaging program. The instant messaging server may be implemented, for example, using host server 16. When a user is connected to the network and executes the instant messaging program, the instant messaging program contacts the host server 16 and logs the user onto the host server 16. The host server 16 informs the instant messaging program when the program user's contacts are online and facilitates communications between the program user and an online contact.

The host server 16 may support IM services irrespective of a program user's network or Internet access. Thus, host server 16 may enable users to send and receive IMs, regardless of whether they have access to any particular Internet service provider (ISP). The host server 16 also may support associated services, such as administrative matters, advertising, directory services, chat, and interest groups related to IM. To transfer data, the host server 16 employs one or more IM protocols.

To begin an IM session, the IM client program running on a client system 12, 14 establishes a connection with the host server 16 and logs onto the host server 16. Once a session is established, a user can use the IM client program to view whether particular buddies are online, exchange IMs with particular buddies, participate in group chat rooms, trade files such as pictures, invitations or documents. The IM program user also may be able to find other buddies with similar interests, get customized information such as news and stock quotes, and search the World Wide Web.

Host server 16 may assist IM communications between users of IM client programs by facilitating the establishment of a peer-to-peer communication session between the IM client programs. Or the host server 16 may assist IM communications by directly routing communications between the IM client programs.

When a contact is online, the IM program user can communicate or interact with the contact in a number of ways. For instance, the IM program user can send an instant message to the contact (typically in the form of text).

Sending a message opens up a window in which messages can be typed back-and-forth between the IM program user and the contact. Similarly, the IM program user also can send a file or other content to the contact.

To initiate these actions for a contact, the IM program user performs operations on the representation of the contact displayed in user interface 305. The program then executes the corresponding action in response to the operation performed on the representation. For example, an instant message might be initiated by double-clicking on a contact's representation. Or, a file transfer might be initiated by the IM program user selecting the contact's representation to bring up a context menu and choosing "send a file" from the menu.

Other actions can be executed in response to operations performed on the representation of the contact displayed in interface 305. For instance, a "buddy icon" can be set for the contact such that communications with the contact display the buddy icon. In addition, for example, profile information about the contact can be retrieved, an alert can be set to inform the program user when the contact is online, a VoIP communication session can be established, or an e-mail can be sent.

User interface 305 may have icons 330 to help a user set various options or perform operations in the instant messaging program.

The techniques described above are not limited to any particular hardware or software configuration. Rather, they may be implemented using hardware, software, or a combination of both. The programs may be implemented in a high-level programming language and may also be implemented in assembly or other lower level languages, if desired. Any such program will typically be stored on a computer-usable storage medium or device (e.g., CD-ROM, RAM, or magnetic disk). When read into the processor of the computer and executed, the instructions of the program cause the programmable computer to carry out the various operations described.

Furthermore, while the techniques have been described primarily with IM applications, they may be applied to other communications programs such as FTP programs, e-mail programs, voice-over-IP (VoIP) or other telephony programs, or players for streaming media.

It is to be understood that the foregoing description is intended to illustrate and not to limit the scope of the disclosure, which is defined by the scope of the appended claims. Other embodiments are within the scope of the following claims.

What is claimed is:

1. A method comprising:
  receiving a request from a first user system linked to a network of interconnected computer system nodes to retrieve at least one data item being continuously forwarded among the nodes in the network, the forwarded at least one data item being constantly routed within the network from node to node without storing the forwarded at least one data item on any fixed storage medium, the first user system executing a real-time communications client program that establishes a real-time communications session with a second user system executing a real-time communications client program;
  retrieving the at least one data item from a node in response to the request from the first user system to retrieve the at least one data item; and
  forwarding the retrieved at least one data item to the second user system.

2. The method of claim 1 wherein retrieving comprises:
  matching the data item request at a central server in the network using a hash mark representing the at least one data item entering a node;
  sending a message to a node that is predicted to have the at least one data item, the message instructing the node to forward the at least one data item to the first user system; and
  sending a confirmation message to the central server that the at least one data item has been forwarded to the first user system.

3. The method of claim 2 further comprising receiving an acknowledgment from the first user system that the requested at least one data item has been received.

4. The method of claim 1 wherein the data item includes at least one of a audio file, audiovisual file, image file, video file, general binary data, or text file.

5. The method of claim 1 wherein the real-time communications client program is an instant messaging client program, an E-mail client program, a File Transfer Protocol (FTP) client program, or a Voice Over Internet Protocol (VoIP) client program.

6. A tangible computer readable medium embodying instructions for causing a data processing apparatus to perform a method for facilitating real-time communication on a node forwarding framework, the method comprising:
  receiving a request from a first user system linked to a network of interconnected computer system nodes to retrieve at least one data item being continuously forwarded among the nodes in the network, the forwarded at least one data item being constantly routed within the network from node to node without storing the forwarded at least one data item on any fixed storage medium, the first user system executing a real-time communications client program that establishes a real-time communications session with a second user system executing a real-time communications client program;
  retrieving the at least one data item from a node in response to the request from the first user system to retrieve the at least one data item; and
  forwarding the retrieved at least one data item to the second user system.

7. The computer readable medium of claim 6 wherein retrieving comprises:
  matching the data item request at a central server in the network using a hash mark representing the at least one data item entering a node;
  sending a message to a node that is predicted to have the at least one data item, the message instructing the node to forward the at least one data item to the first user system; and
  sending a confirmation message to the central server that the at least one data item has been forwarded to the first user system.

8. The computer readable medium of claim 7 wherein the method further comprises
  receiving an acknowledgment from the first user system that the requested at least one data item has been received.

9. The computer readable medium of claim 6 wherein the at least one data item includes at least one of a audio file, audiovisual file, image file, video file, general binary data, or text file.

10. The computer readable medium of claim 6 wherein the real-time communications client program is an instant messaging client program, an E-mail client program, a File Transfer Protocol (FTP) client program, or a Voice Over Internet Protocol (VoIP) client program.

11. A framework comprising:
  a group of interconnected computer system nodes, each node configured to:
  A) in response to a request from a client system to store data, receive at least one data item and continuously forward the at least one data item among the computer system nodes without storing the forwarded at least one data item on any fixed storage medium, the forwarded at least on data item being constantly routed from node to node within the group of interconnected computer system nodes; and B) in response to a request from the client system to retrieve the at least one data item; retrieve the at least one data item being continuously forwarded among the computer system nodes; and at least two client systems linked to the group, each of the client systems executing a real-time communications client program.

12. The framework of claim 11 wherein each node is adapted to detect the presence of the at least one data item, apply a time stamp, and forward the at least one data item to another node in the interconnected computer system nodes according to a node's availability.

13. The framework of claim 12 wherein the node's availability is determined according to its volume of network traffic.

14. The framework of claim 12 wherein each node encrypts the at least one data item.

15. The framework of claim 11 wherein the group of nodes comprises a central server that is adapted to match the data item retrieval request of the client system using a hash mark representing the at least one data item entering a node, send a message to a node that is predicted to have the at least one data item, the message instructing the node to forward the at least one data item to the requesting client system, and receive a confirmation message that the at least one data item has been forwarded to the requesting client system.

16. The framework of claim 11 wherein the real-time communications client program is an instant messaging client program, an E-mail client program, a File Transfer Protocol (FTP) client program, or a Voice Over Internet Protocol (VoIP) client program.

17. The framework of claim 11 wherein the at least one data item includes at least one of a audio file, audiovisual file, image file, video file, general binary data, or text file.

* * * * *